US012705533B2

(12) United States Patent
Para et al.

(10) Patent No.: US 12,705,533 B2

(45) Date of Patent: Aug. 11, 2026

(54) SYSTEMS AND METHODS FOR IMPROVING PREDICTION PROCESS USING AUTOMATED RULE LEARNING FRAMEWORK

(71) Applicant: Genpact USA, Inc., New York, NY (US)

(72) Inventors: Hitesh Para, Mynampadu (IN); Meenakshi Sundaram Murugeshan, Bangalore (IN); Sreekanth Menon, Bangalore (IN); Prakash Selvakumar, Bangalore (IN)

(73) Assignee: Genpact USA, Inc., New York, NY (US)

( * ) Notice: Subject to any disclaimer, the term of this patent is extended or adjusted under 35 U.S.C. 154(b) by 874 days.

(21) Appl. No.: 18/077,674

(22) Filed: Dec. 8, 2022

(65) Prior Publication Data

US 2024/0193469 A1 Jun. 13, 2024

(51) Int. Cl.
*G06N 20/00* (2019.01)

(52) U.S. Cl.
CPC .................................... *G06N 20/00* (2019.01)

(58) Field of Classification Search
CPC ............................... G06N 20/00; G06N 5/025
USPC ............................................................ 706/12
See application file for complete search history.

(56) References Cited

U.S. PATENT DOCUMENTS 10,922,725 B2 2/2021 Mustafi et al.
2010/0241639 A1* 9/2010 Kifer ..................... G06F 16/313 707/754
2015/0019461 A1* 1/2015 Simard ................. G06F 40/242 706/11
2019/0311301 A1* 10/2019 Pyati ..................... G06F 16/901
2019/0370384 A1* 12/2019 Dalek ................... G06F 16/285
2022/0108086 A1* 4/2022 Wu ......................... G06F 40/35
2022/0269862 A1* 8/2022 Li ......................... G06F 40/169
2022/0292391 A1* 9/2022 Daly ........................ G06N 5/04
2022/0414137 A1* 12/2022 Sewak ................ G06F 16/3346

(Continued)

OTHER PUBLICATIONS

Bishnu et al., "Software Fault Prediction Using Quad Tree-Based K-Means Clustering Algorithm", IEEE Transactions on Knowledge and Data Engineering, vol. 24, No. 6, Jun. 2012, pp. 1146-1150. (Year: 2012).*

(Continued)

*Primary Examiner* — Hwei-Min Lu

(74) *Attorney, Agent, or Firm* — Foley & Lardner LLP

(57) ABSTRACT

The disclosure relates to a method for receiving labelled data from data sources; generating a plurality of segments from the labelled data using tokenizers, wherein each of the segments is associated with one or more classes, and wherein the plurality of segments comprises a sub-plurality of unique segments; calculating an entropy value for each of the sub-plurality of unique segments; for each class, generating one or more rules based on each of the segments associated with the class and the entropy value of each such segment; and combining the generated one or more rules with a model to improve prediction performance of the model. The labelled data is input data for a classifier model to form predictions and false positives are extracted from the predictions. The model explainability techniques and the false positives are used to create additional rule.

20 Claims, 10 Drawing Sheets

(56) References Cited

U.S. PATENT DOCUMENTS

| | | | | |
|---|---|---|---|---|
| 2023/0161960 | A1* | 5/2023 | Panwar | G06F 18/2431 704/9 |
| 2023/0186072 | A1* | 6/2023 | Le | G06N 3/045 706/25 |

OTHER PUBLICATIONS

Sharma et al., "Bottom-up Pittsburgh approach for discovery of classification rules", 2014 International Conference on Contemporary Computing and Informatics (IC3I), Nov. 27-29, 2014, pp. 31-37. (Year: 2014).*

Roodposhti et al., "A Novel Rule-Based Approach in Mapping Landslide Susceptibility", Sensors (Basel, Switzerland), 19(10), 2274, May 16, 2019, pp. 1-20. (Year: 2019).*

Chen, et al., "Hybrid Machine Learning Models of Classifying Residential Requests for Smart Dispatching", ARXIV ID: 1912.10546, Dec. 22, 2019, pp. 1-22. (Year: 2019).*

Zhang et al., "CMIRGen: Automatic Signature Generation Algorithm for Malicious Network Traffic", 2020 IEEE 19th International Conference on Trust, Security and Privacy in Computing and Communications (TrustCom), Dec. 2020, pp. 736-743. (Year: 2020).*

Kartchner et al., "Rule-Enhanced Active Learning for Semi-Automated Weak Supervision", Artificial intelligence, 3(1), Mar. 2022, pp. 211-228, (Author manuscript, available in PMC Jul. 14, 2022, pp. 1-27). (Year: 2022).*

Aubaid, A. M. et al., "A Rule-Based Approach to Embedding Techniques for Text Document Classification", Applied Sciences, (Jun. 10, 2020), vol. 10, 4009, 22 pages.

Cito, J. et al., "Explaining Mispredictions of Machine Learning Models using Rule Induction", ESEC/FSE, Athens, Greece, (Aug. 23-28, 2021), 12 pages.

Palliser-Sans, R., "RRULES: An improvement of the RULES rule-based classifier", arXiv:2106.07296, https://doi.org/10.48550/arXiv.2106.07296, (Jun. 14, 2021), 6 pages.

Ribeiro, M. T. et al., "Anchors: High-Precision Model-Agnostic Explanations", Association for the Advancement of Artificial Intelligence, (2018), vol. 32(1), 9 pages.

Sushil, M. et al., "Rule induction for global explanation of trained models", Proceedings of the 2018 EMNLP Workshop BlackboxNLP: Analyzing and Interpreting Neural Networks for NLP, (Nov. 1, 2018), pp. 82-97.

* cited by examiner

Multi-Label Data

| Review | Label |
|---|---|
| I am planning to book tickets for a two-bedroom villa but it was not booked due payment issue. | ["Ticket Booking", "Payment Issues"] |
| The application shows server busy when I tried to book tickets for my dinner. | ["Ticket Booking", "Application Issues"] |

Multi-Class Data

| Review | Label |
|---|---|
| I am planning to go on 5-day trip during Christmas and looking for possible options. | Plan Vacation |
| The travel booking application has lot of issues and I am not able to make payment. | Application Issues |

<table>
<tr><th>Rule</th><th>Review</th><th>Label</th></tr>
<tr><td>Glitch || error|| crash || bug || freeze</td><td>A lot of glitches in the app</td><td>Application Issues</td></tr>
<tr><td>app & help || helpful</td><td>The app is very helpful</td><td>Helpful</td></tr>
<tr><td>update|| recent version || upgrade ~ {glitch, park }</td><td>The app needs to upgrade its features</td><td>Application Updates</td></tr>
<tr><td>open & park & make reservation</td><td>The park has been open to book the reservations</td><td>Park Reservations</td></tr>
</table>

Figure 5:
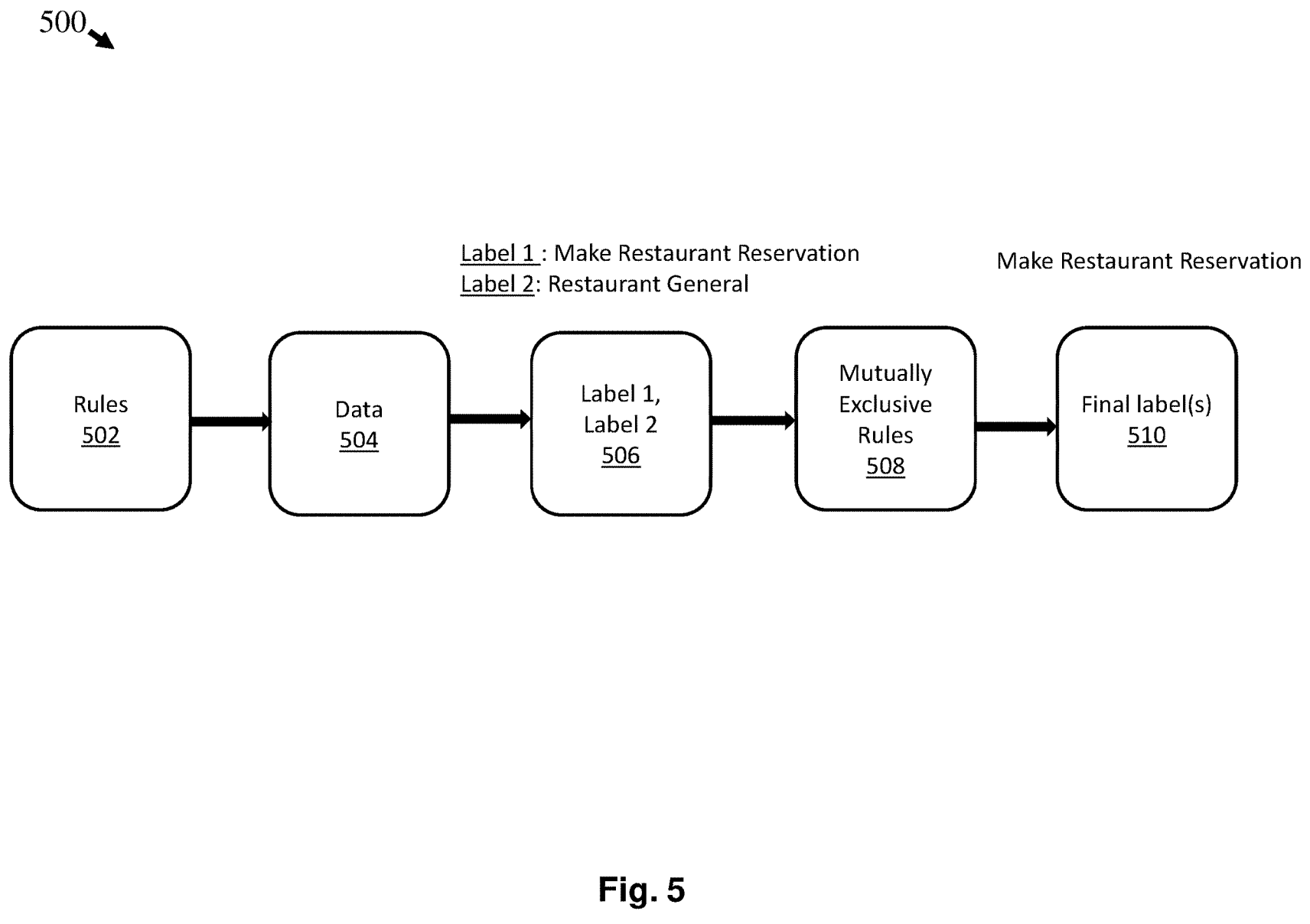

Rules
502

Data
504

Label 1 : Make Restaurant Reservation
Label 2: Restaurant General

Label 1,
Label 2
506

Mutually
Exclusive
Rules
508

Make Restaurant Reservation

Final label(s)
510

<table>
<tr><th colspan="2">Rules with Entropy=0</th></tr>
<tr><th>Label</th><th>Rules</th></tr>
<tr><td>Reminders</td><td>notifications||reminders || notifying</td></tr>
<tr><td>Application Performance</td><td>app slow||bit slower||slow||app really slow||painfully slow||runs slow||much lag||little slow</td></tr>
<tr><td>Login Issues</td><td>logins||password reset||unable sign||change password||logins never worked||loop logging||authenticate</td></tr>
<tr><td>Helpful</td><td>useful app||really useful|| app easier|| user interface||harder use||app hard</td></tr>
</table>

| Rules with Entropy < Threshold Value | |
|---|---|
| Label | Rules |
| Park Reservations | Open & park & make reservation |
| Food Delivery | breakfast & order & Mobile &Online |

<table>
<tr><th colspan="2">Rules with Entropy < Threshold Value</th></tr>
<tr><th>Label</th><th>Rules</th></tr>
<tr><td>Application Updates</td><td>version||update ~ { card, reservations, helpful, speed}</td></tr>
<tr><td>Login Issues</td><td>log in||sign in ~ { Restaurant, dining, reservation, refund, modify reservation}</td></tr>
<tr><td>Application Issues</td><td>crash ~ {upload, download, overload, credit card, information}</td></tr>
</table>

Fig. 8

SYSTEMS AND METHODS FOR IMPROVING PREDICTION PROCESS USING AUTOMATED RULE LEARNING FRAMEWORK

TECHNICAL FIELD

The present disclosure is directed to systems and methods for improving machine learning models using an automated rule learning framework.

BACKGROUND

Industries from various sectors gather information from users in the form of feedbacks and reviews. The information that the industries gather includes big, medium, and small data. When the size of the data is small (e.g., between 1 and 30 samples), creating a model by machine learning or deep learning techniques becomes a challenge. In addition, the machine learning or the deep learning techniques may not classify the data correctly. Therefore, there is a need to solve these problems.

SUMMARY

In one aspect, the subject matter of this disclosure relates to a method for receiving labelled data from one or more data sources; generating a plurality of segments from the labelled data using one or more tokenizers, wherein each of the segments is associated with one or more classes of a plurality of classes, and wherein the plurality of segments comprises a sub-plurality of unique segments; calculating an entropy value for each of the sub-plurality of unique segments; for each class in the plurality of classes, generating one or more rules based on each of the segments associated with the class and the entropy value of each such segment; and combining the generated one or more rules with a model to improve prediction performance of the model. The method may further includes performing clustering of centroid samples on the labelled data if the labelled data is above a threshold value. The clustering of centroid samples may include clustering a defined number of nearest centroids samples, the defined number provided by a user. The threshold value may depend on configurations of a user and one or more hardware limitations of a system for improving a prediction process. The method may further include performing one or more pre-processing steps on the labelled data. Each of the sub-plurality of unique segments may have one label. The labelled data may be input data for a classifier model to form one or more predictions. The one or more false positives may be extracted from the one or more predictions. One or more model explainability techniques and the extracted one or more false positives may be used to create rules in addition to the one or more rules. One or more model explainability techniques may be used to determine which token results in misclassification of the labelled data. The one or more rules may be created by a semantic rule builder.

In one aspect, the subject matter of this disclosure relates to a system for improving a model, the system may include a memory; and one or more processors coupled with the memory, wherein the one or more processors, when executed, perform operations comprising receiving labelled data from one or more data sources; generating a plurality of segments from the labelled data using one or more tokenizers, wherein each of the segments is associated with one or more classes of a plurality of classes, and wherein the plurality of segments comprises a sub-plurality of unique segments; calculating an entropy value for each of the sub-plurality of unique segments; for each class in the plurality of classes, generating one or more rules based on each of the segments associated with the class and the entropy value of each such segment; and combining the generated one or more rules with a model to improve prediction performance of the model. The method may further include performing clustering of centroid samples on the labelled data if the labelled data is above a threshold value. The clustering of centroid samples may include clustering a defined number of nearest centroids samples, the defined number provided by a user. The threshold value may depend on configurations of a user and one or more hardware limitations of a system for improving a prediction process. The method may further include performing one or more pre-processing steps on the labelled data. Each of the sub-plurality of unique segments may have one label. The labelled data may be input data for a classifier model to form one or more predictions. The one or more false positives may be extracted from the one or more predictions.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1*b* illustrates examples of multi-label data and multi-class data, according to various embodiments of the present disclosure.

FIG. 4 illustrates a table between rules, reviews, and labels, according to various embodiments of the present disclosure.

FIG. 5 illustrates a flow diagram of finding labels by using mutually exclusive rules, according to various embodiments of the present disclosure.

FIG. 6 illustrates a table of rules with an entropy value being zero, according to various embodiments of the present disclosure.

FIG. 7 illustrates a table of rules with an entropy value being less than a threshold value, according to various embodiments of the present disclosure.

FIG. 8 illustrates a table of other rules with an entropy value being less than a threshold value, according to various embodiments of the present disclosure.

DETAILED DESCRIPTION

Figure 1A:
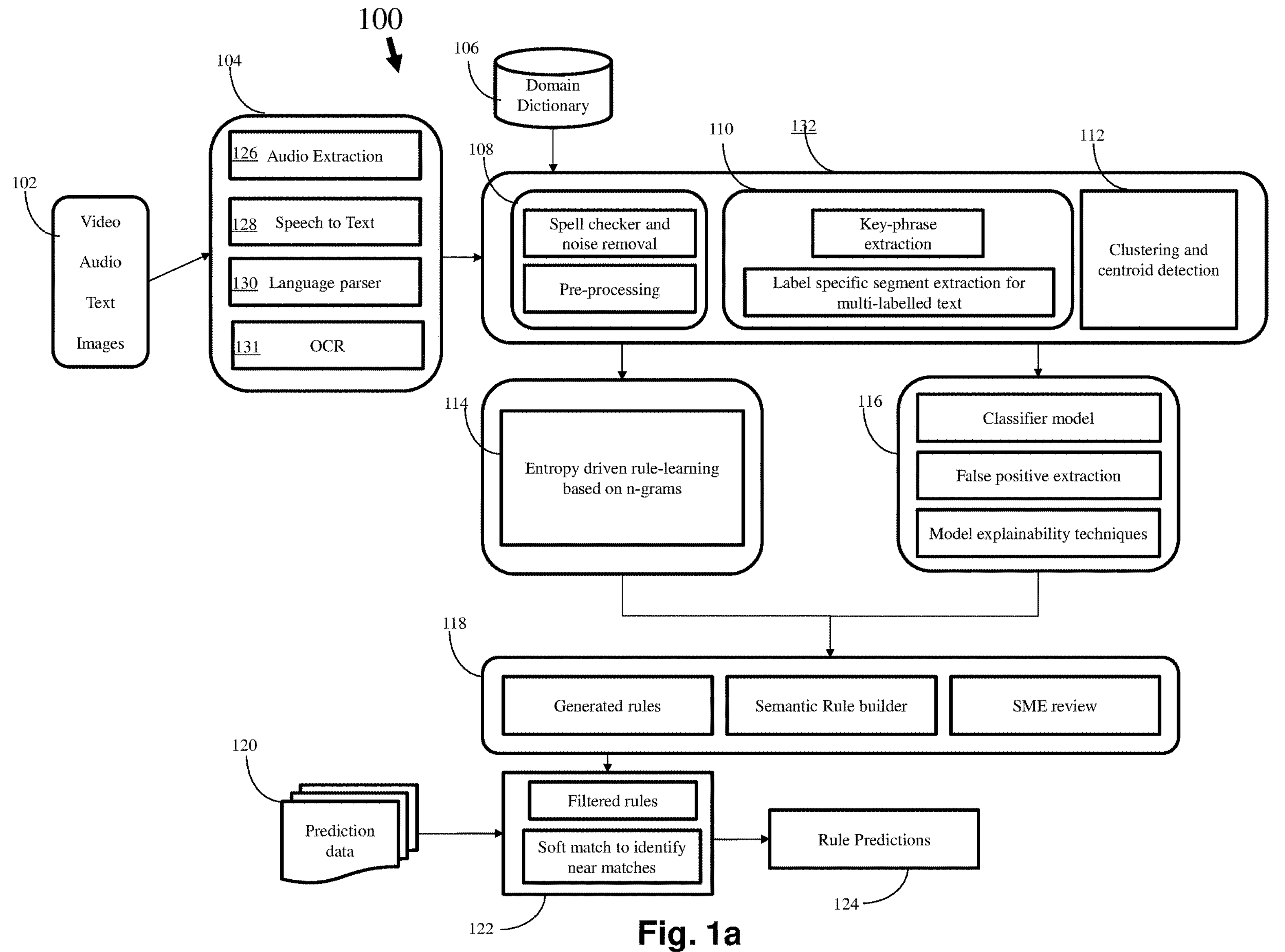
FIG. 1*a* illustrates a generic rule-learning framework, according to various embodiments of the present disclosure.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel. Any dimension or example part called out in the figures are examples only, and the example embodiments described herein are not so limited.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

With reference to the drawings, the invention will now be described in more detail. The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Currently, industries in various sectors gather multiple domain-specific information from end-users in the form of feedback and reviews. In most cases, the data size is very small (e.g., between 1 and 30 samples) and applying text mining techniques leveraging machine learning and deep learning may not result in desirable results to classify the data correctly. Therefore, some hand-crafted rules may become an alternate approach where a subject matter expert (SME) may need to go through requirements and devise domain-specific rules. However, the approach is a time-consuming process even for small data and the approach may not be a comprehensive process. The approach may also need to go through multiple manual refinements. The rule development increases the development time and the rules do not capture ambiguous or overlapping categories. The rules are difficult to manage when the number of rules and categories become larger. In some examples, text data in a form of review or feedback is noisy and contains spelling mistakes. However, it is necessary to capture the texts from the text data in the rule generation even the text data is noisy and contains spelling mistakes. During the prediction of the text, retaining high precision and capturing semantically similar patterns are important. Therefore, there is a need to automate rule construction with minimal supervision to address these challenges. In particular, the rule learning techniques in the present invention may allow for improvements of existing machine learning models. The rule learning techniques in the present invention may enhance prediction quality of the machine learning models. The rule learning techniques in the present invention may increase data processing efficiency of the machine learning models.

In one embodiment, the present invention is able to learn rules from a very small multi-labelled dataset which is highly imbalanced. The present invention may fix grammatically incorrect texts. Rules may be automatically enhanced with semantic pattern generation that are refined by an SME, which may improve precision without impacting recall. It is noted that "recall" refers to how many true positives out of all positive samples present in the data.

In an embodiment, a generic entropy driven rule learning framework is discussed in the present disclosure. The generic driven rule learning framework in the present disclosure may be applied across different types of data which may be structured, unstructured, or a combination of both in tabular data. It is noted that structured data may be quantitative data, which may be highly organized and easily decipherable by machine learning algorithms. It is also noted that unstructured data may be qualitative data, which may not be processed and analyzed via conventional data tools and methods.

In an embodiment, rule learning may be performed from unstructured text data where the features are in a form of N-gram of different order. It is noted that the N-gram is a contiguous sequence of N items from a given sample of text or speech. The items may include, but not limited to, phonemes, syllables, letters, words, or base pairs according to the application. The N-grams may be collected from a text.

In an embodiment, features in structured data may be in the form of numerical values or N-grams depending on the nature of data and content type. For example, the feature in the structured data may include date and age.

In an embodiment, the framework in the present disclosure is domain agnostic and generic such that it supports rule generation on English and other languages. For example, a review written in various languages may require different tokenizers or parsers to extract N-grams. It is noted that the framework in the present disclosure has a multilingual support.

In an embodiment, the data may be ingested from different sources such as image, video, audio, or text. In an example, from the audio or video data, respective content parsers 104, which will be discussed later in FIG. 1, may be used to convert them to text before feeding into the framework in the present disclosure.

In one embodiment, an entropy driven approach in the present disclosure may be combined along with model interpretability that may evaluate the N-grams and generate rules with multiple conditions (e.g., contains and does not contain) with multiple operators (e.g., AND, OR, and Negation) towards text classification. For example, initially, an N-gram that contributes uniquely to specific categories is extracted. Further, an N-gram that is common across multiple categories is leveraged to build rules with a Negation condition. Finally, domain ingestion by an SME helps to filter irrelevant N-grams and add domain specific equivalent forms.

In one embodiment, the framework for rule learning in the present disclosure focuses on leveraging a distribution of N-grams among positive and negative categories for text classification. For example, initially, input text in training data is split into N-grams such as, but not limited to, unigrams, bigrams, or trigrams. The order of N-gram (e.g., the N is 3 for the trigram) may be decided based on one or more use-cases and domain-specific category distribution reviewed by the SME.

In one embodiment, the subject matter expert in the present disclosure reviews the classes and clusters, and the SME in the present disclosure defines class relationships. The class relationships may include classes which have generic-specific hierarchical relationships where some specific classes take higher priority. The SME may be a person who has a great knowledge in a particular field or topic and the level of knowledge is demonstrated by the person's degree or license. For example, a PhD in computer science may be declared as an SME in the field of computer technology. The SME in the present disclosure may be, but not limited to, a person who has a great knowledge on the business challenge and data. In some examples, if the data is in the medical domain, then SME may be a person who has knowledge on medical data and business use cases related to the medical data.

In one embodiment, some classes may be mutually exclusive and may not co-exist. The classes may be analyzed and cleaned during a post-processing phase to refine conflicts and derive correct classes. For example, a class "Restaurant General" and a class "Make Restaurant Reservations" are mutually exclusive, so we may exclude the class "Restaurant General" and retain the class "Make Restaurant Reservations."

In one embodiment, entropy as a measure of disorder and impurity is applied to identify an importance of an N-gram to each class, which will be discussed later in FIG. 3.

Referring to FIG. 1*a*, a generic rule-learning framework 100 is shown, according to various embodiments of the present disclosure. Referring to FIG. 1*b*, examples of multi-label data and multi-class data are shown, according to various embodiments of the present disclosure.

In one embodiment, in the framework 100, one or more data sources 102 are used to provide data for the framework 100. The one or more data sources 102 include, but are not limited to, images, videos, audios, and texts. After receiving the data from the one or more data sources 102, one or more content parsers 104 are used to parse the data from the one or more data stores 102.

The one or more content parsers 104 may include, but are not limited to, audio extractor 126, a speech to text parser 128, a language parser 130, and optical character recognition (OCR). The OCR may be used to extract texts from the images. The audio extractor 126 may extract sound or audio files from the videos or the audios. In one example, the videos may be, but are not limited to, video home system (VHS) videos, digital video disc (DVD) videos, or online streaming videos. The audio may be, but is not limited to, sound from the VHS videos, sound from the DVD videos, sound from the online streaming videos, waveform audio file format (WAV) audios, MPEG-1 Audio Layer-3 (MP3) audio files, or any media player audio files. The speech to text parser 128 may be used to parse the text from the videos or audio.

The speech to text parser 128 may create transcriptions for the parsed text. The language parser 130 may be used to parse the language from the text from the one or more data sources 102 directly. The language parser 130 may be used to parse the language from the text in the audio files extracted from the audio extractor 126. The language parser 130 may be used to parse the language from the parsed text from the speech to text parser 128. For example, if the parsed text from an online streaming video includes, but are not limited to, English and Chinese languages, then the language parser 130 may indicate that the text in the online streaming video includes English and Chinese text.

In one embodiment, a domain dictionary 106 may be used in the framework 100. The domain dictionary 106 may be a dictionary that is specific to a topic of study. For example, if the domain dictionary 106 is a medical domain dictionary, then the medical domain dictionary may include the definitions and vocabularies of medical names, disease names, short forms, or the like. The domain dictionary 106 and data from the one or more content parsers discussed above may be sent to block 132 for processing. The block 132 includes one or more processors to perform one or more processing steps for the data from the one or more content parsers 104, which include processor 108, processor 110, and processor 112.

At the processor 108, the data from the one or more content parsers 104 may be checked for spelling based on the data from the domain dictionary 106. The data from the one or more content parsers 104 may be filtered to remove noise based on the data from the domain dictionary 106. The data from the one or more content parsers 104 may also be pre-processed in the processor 108. The pre-processing steps may include, but are not limited to, stop words removal, labelling errors removal, stemming identification, spelling corrections, punctuations removal, irrelevant characters removal, and pictorial characters removal.

At the processor 110, the extraction of the key phrases and the labelling of the specific segment extraction for multi-label data are optional. The data from the processor 108 may be extracted for key phrases if the data from the processor 108 includes multi-label data. The processor 110 may convert the multi-label data to multi-class data. The key phrases may be phrases in the domain dictionary 106 and most of the key phrases may be automatically extracted by the processor 110. The key phrases may be clustered by a machine learning model based on number of unique classes. For example, if there are five unique classes in the multi-label data from the processor 108, then five clusters of key phrases are formed. The clusters of the key phrases may be reviewed manually by a SME. Once the clustering of the key phrases is done, the review of the multi-label data from the processor 108 continues. The multi-label data may be split using sentence tokenizers. The sentence tokenizers may make sure that each segment of the multi-label data has no more than one class. The processor 110 may further apply class labels to each of the segments. Once the multi-class labelling is completed, then the processor 108 continues with performing rule learning of the multi-class data. It is noted that the multi-label data represents that the data may have more than one label. It is also noted that the multi-class data represents that the data only has one label.

At the processor 112, the clustering and centroid detection are optional. The multi-class data from the processor 110 may be sent to the processor 112 for clustering and centroid detection only if the amount of multi-class data is above a threshold value. If the multi-class data from the processor 110 is above the threshold value, the data may be clustered and a defined number of nearest centroids samples may be chosen for rule learning. For example, if there are 10,000 samples that need to be reviewed and there are ten unique labels, then the processor 112 may cluster these 10,000 samples into ten clusters and a defined number (e.g., 100) of the nearest centroids samples may be chosen by the processor 112 to perform rule learning. Thus, the amount of samples in each cluster are much less than the total amount of samples (e.g., 10,000 samples) from the processor 110, therefore, the complexity of the rule learning for these samples reduces. The 100 nearest centroids samples may further be used for rule learning. The threshold value and the defined number may be provided by a user of the system. The threshold value may also depend on user's configurations or hardware limitations. The advantage of using clustering and centroid detection may include reducing computation time of the system.

After the processing in the block 132, the data or the text may be sent to blocks 114 and 116 for further processing. The processing may be performed in the blocks 114 and 116 simultaneously. However, in an example, the data from the block 132 may be first sent to the block 114 and then sent to the block 116 for processing. In another example, the data from the block 132 may be first sent to the block 116 and then sent to the block 114 for processing.

At block 114, the processing of the data or the text may include entropy driven rule-learning based on the N-grams. The processing in block 114 may also be based on, but not limited to, one or more language specific tokenizers. For example, the one or more language specific tokenizers may include, but are not limited to, texts that are divided by pieces from a raw text. As discussed above, the N-gram is a contiguous sequence of N items from a given sample of text or speech. In this example, the N-gram may be a contiguous sequence of N items from the data from the block 132.

At block 116, the processing of the data or the text from the block 132 may include a classifier model. The classifier model may be created with the labelled data or text from the processor 110 discussed above. The processing of the data or the text from the block 132 may also include false positive extraction. A false positive may be an outcome where the classifier model incorrectly predicts the class. For example, the classifier model predicts the data as "class 0" but actually the data is "class 1."

At block 116, the processing of the data or the text from the block 132 may include one or more model explainability techniques, which may be used in a model explainability driven rule learning approach. The machine learning models may be considered as a black box, which are not easily interpretable to identify the root cause for the predictions. Thus, the one or more model explainability techniques may be used to analyze and understand results provided by the classifier model or one or more machine learning models. The model explainability techniques may provide a reason why the classifier model or the one or more machine learning models predict particular results. The model explainability algorithms may be used to derive rules by analyzing the predictions from the machine learning models and the same machine learning models may be used to predict on upcoming data. The one or more model explainability techniques may include determining which tokens result in misclassification of the text or data and the one or more model explainability techniques may write rules to ensure that the misclassification of the text or data may not happen in the one or more machine learning models.

After the processing of the data from the blocks 114 and 116, the rules are sent to the block 118. The block 118 includes semantic rule builder, generated rules, and SME review. The block 118 also includes a sematic rule builder. The semantic rule builder uses the rules generated from the entropy driven rule-learning approach in the block 114 and the model explainability driven rule-learning approach in the block 116 as its input and then the semantic rule builder generates additional rules which are semantically similar. The generation of the rules may also be discussed in detail later in FIG. 3 The block 118 also includes SME review. The SME review may review the categories and clusters of the data and defines the category relationships. For example, as discussed above, the SME review may include categories having a generic-specific hierarchical relationship where some specific categories may have higher priority. In addition, the SME may also review the rules that are generated from the blocks 114 and 116 and eliminate unnecessary rules, which ensures that domain specific relationships are correctly captured.

After the processing of the rules from the block 118, the rules are sent to the block 122. The block 122 receives prediction data from the block 120. The prediction data may include, but are not limited to, model prediction data. The model prediction data may be in a form of videos, audios, or images. The model prediction data may be future data that may be used in the machine learning models. The block 122 may contain the rules reviewed by the SME, which are filtered rules. The block 122 may perform a soft match to identify near matches. The block 122 may use the prediction data from the block 120 as input and apply the filtered rules in the block 122 to make predictions to the block 124.

For example, the tokens in the block 116 may predict that a class for an input "there are too many bugs in the application, so it is not helpful" belongs to class "Helpful". However, this is false positive since the true class for this input is "Application Issues", so this input is sent to the model explainability techniques in the block 116. The model explainability techniques then provide the tokens that are responsible for predicting the class "Helpful" to be "Helpful". In contrast, the model explainability techniques provide the tokens that are responsible for not predicting the class "Helpful" to be "Bugs". A rule is then created that the input goes to class "Application Issues" when "Helpful" token is not present and "Bugs" token is present. In some embodiments, part of the labelled data may be used for training and part of the labelled data may be used for validation, e.g., 70% of the labelled data for training and 30% of the labelled data for validation.

Figure 2:
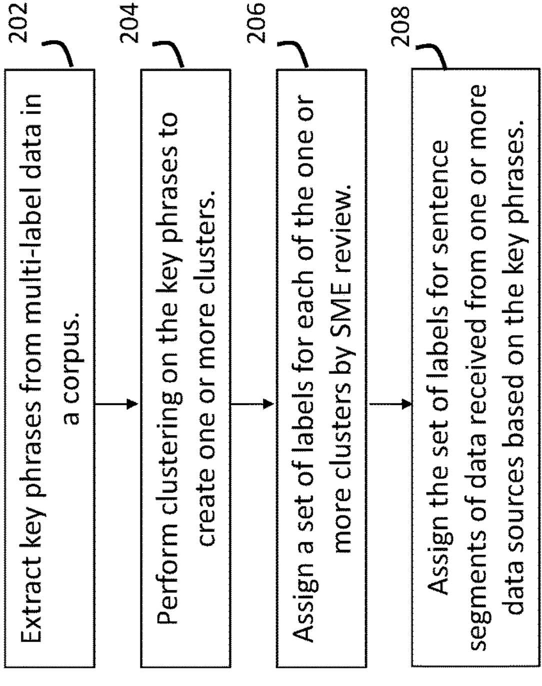
FIG. 2 illustrates a flow diagram of converting multi-label data into multi-class data by key phrase driven mapping, according to various embodiments of the present disclosure.

Referring to FIG. 2, a flow diagram 200 of converting multi-label data into multi-class data by key phrase driven mapping is shown, according to various embodiments of the present disclosure. FIG. 2 also provides more details of the processor 110 in FIG. 1*a*.

At block 202, key phrases are extracted from multi-label data in a corpus. The corpus may be a collection of written texts or an entire writing of a particular subject. The corpus may be a language resource consisting of a large and structured set of texts. In an example, the corpus may be a collection of documents which is being searched. In some examples, the corpus may contain texts in a single language or text data in multiple languages. The extraction of the key phrase may be performed by the block 110 discussed above. The key phrase may be a string containing a noun phrase that describes a particular thing. The key phrase may include, but is not limited to, a noun. The key phrase may include one or more modifiers to distinguish the noun. For example, for a noun phrase "a beautiful house," an article "a" and an adjective "beautiful" are modifiers that are used to distinguish the noun "house." The key phrase may also include a set of separate words that build the phrase, and the set of separate words may be key words. The key phrase may be used by users of a system to search for information related to the key phrase.

At block 204, clustering on the key phrases is performed and one or more clusters are created. The clustering may be a task of dividing data points into a few groups such that the data points in the same groups may be more similar to other data points in the same group than those in other groups. For example, the key phrases in the present disclosure may be clustered into multiple groups. The key phrases in a first group may be similar to other key phrases in the first group. The key phrases in the same group may have, but are not limited to, one or more same words in the key phrase, or have similar meanings to each other. For example, a first phrase "parking lot" and a second phrase "parking garage" may be in a same cluster.

At block 206, a set of labels are assigned for each of the one or more clusters by SME review. For example, in the example discussed above, a cluster that includes the two key phrases "parking lot" and "parking garage" may be assigned a label "parking" since both are related to parking after review by the SME. In another example, a cluster that includes a key phrase "French fries" and a key phrase "Italian food" may be assigned a label "food" since both are related to food.

At block 208, the set of labels are assigned to each of the sentence segments of data received from one or more data sources based on the key phrases. For example, if a sentence "I want to have Italian food for dinner" is divided into "I", "want to have," "Italian food," and "for dinner," then the key phrases in this sentence are "want," "Italian food," and "for dinner." The key phrase "Italian food" may be assigned to a label "food," and the key phrase "for dinner" may be assigned to a label "meal." It is noted that the one or more data sources may be video, audio, and text in the block 102 discussed above in FIG. 1*a*. The data may have been parsed by the content parsers 104 discussed above in FIG. 1*a*. The data may have been pre-processed including checking for spelling in the block 108 before being assigned with labels on the sentence segments. In some examples, the data may be pre-processed including checking for spelling in the block 108 and being assigned with labels on the sentence segments simultaneously. After the processing in the block 208, the labeled data is further processed, which will be discussed with respect to FIG. 3.

Figure 3:
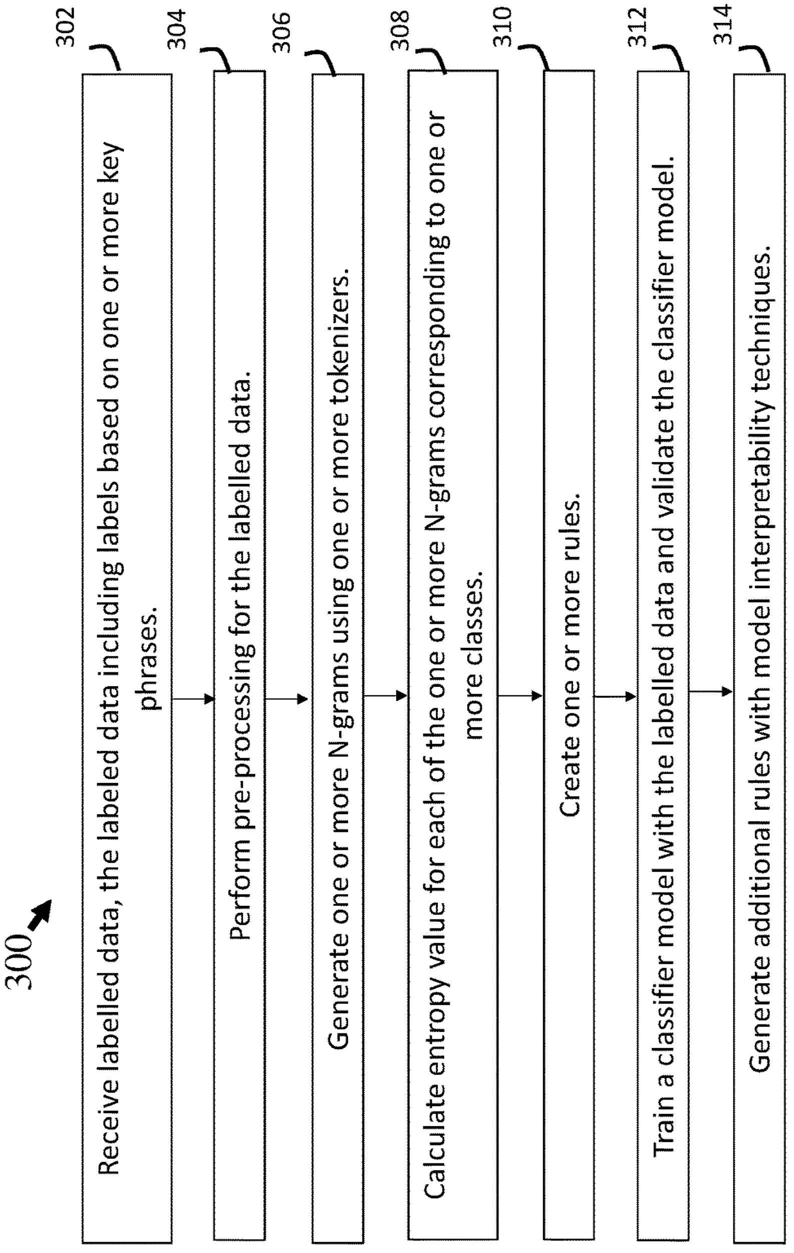
FIG. 3 illustrates a flow diagram of creating rules for data received from data sources, according to various embodiments of the present disclosure.

Referring to FIG. 3, a flow diagram 300 of creating rules for data received from data sources is shown, according to various embodiments of the present disclosure.

At block 302, labelled data is received and the labelled data includes labels based on one or more key phrases. The labelled data may be created and labelled by the process in FIG. 2. The labelled data may include one or more sentence segments and the sentence segments may be labelled based on the key phrases. The labels may be generated after the clustering of the key phrases and the labels may be assigned to each of the clusters and further be assigned to each of the key phrases which are discussed above in the blocks 204 and 206.

At block 304, the labelled data is pre-processed. The pre-processing includes, but is not limited to, stop words removal, labelling errors removal, stemming identification, spelling corrections, punctuations removal, irrelevant characters removal, and pictorial characters removal. The pre-processing may be performed by the processor 108 discussed above in FIG. 1*a*.

At block 306, one or more N-grams are generated using one or more tokenizers. The one or more tokenizers may be, but is not limited to, language specific. The tokenizers may be words. The N-gram may be, but is not limited to, unigram, bigram, and trigram. The pre-processed data received from the block 306 may include sentences or paragraphs, which may be divided into the one or more N-grams generated using the tokenizers.

At block 308, an entropy value for each of the one or more N-grams is calculated and the one or more N-grams may correspond to one or more classes. The entropy value may be calculated based on the labels and input sentences. In an embodiment, in order to generate rules, only an entropy value less than a threshold may be considered. If the entropy value is over the threshold, then rules may not be generated. The threshold may be determined by, but not limited to, users of the system, the SME, or a model trained by historical data.

At block 310, one or more rules are created. The rules may include one or more logical or other operators such as "Contains" and "OR." If an N-gram is exclusively present in a particular class and not present in any other classes in the training data, then the N-gram has an entropy score of zero. This N-gram may be defined as a "pure N-gram" depending on an amount of available data being analyzed, and the "pure N-gram" may help in the generation of rules that more accurately classify unknown data. For example, class A includes N-gram 1, N-gram 2, N-gram 3, and N-gram 4. Class B includes N-gram 4, N-gram 5, and N-gram 6. N-gram 1, N-gram 2 and N-gram 3 are included in class A but not in class B. Accordingly, the system generates the following rule for class A, which includes an OR operator ("||") between those N-grams, i.e., N-gram 1||N-gram 2 N-gram 3. When the rule is applied against particular text, if the text comprises any of N-gram 1, N-gram 2 or N-gram 3, the text can be classified as class A.

In some embodiments, the N-gram may be shared by multiple closely related classes. If the N-gram mostly occurs in a specific class and not often in other classes in the training data, then the entropy value may be close to zero, e.g., entropy value is 0.3 for this N-gram. Considerations of N-grams with entropy value close to zero may lead to false positives. In order to eliminate the false positives, the system can generate AND or Negation rules, which may be included as parts of more complex rules, as described below.

For example, N-gram 4 is present in both class A and class B as discussed above. In order not to create false positives due to the presence of N-gram 4, rules may use AND operator ("&") and Negation operator "~" to further distinguish rules for the N-gram. For example, if particular text meets the rule of N-gram 4 & N-gram 5 & N-gram 6, the text is classified in class A instead of class B because, although N-gram 4 is present in both classes A and B, N-gram 5 and N-gram 6 are not present in class B.

In another example, if the rule N-gram 4 &~{N-gram 5 & N-gram 6} is satisfied by particular text, that text is classified in class A instead of class B. This is because, although N-gram 4 exists in both class A and class B, the combination of N-gram 5 and N-gram 6 exists in class B and not class A. As earlier noted, N-grams with entropy exceeding a threshold are not useful for classification because such N-grams appear in too many different classes. One of skill in the art will appreciate the variety of highly complex rules that can be automatically generated on a class-by-class basis in light of the principles described above.

At block 312, a classifier model is trained with the sampled data and the classifier model is validated. The labelled data may be divided into a training dataset and a test dataset. The training dataset may be used to train a model such as the classifier model or a machine learning model, and the test dataset may be used to test the trained model. In some embodiments, if false predictions are identified by the classifier model, the false predictions may be fed into the model interpretability module and further be applied to generate additional rules in addition to the one or more rules in the block 310. In some examples, tokens that triggers wrong predictions may be identified and the tokens may be used to refine the one or more rules with Negation operators discussed above. In some embodiments, the use of "Contains," e.g., a combination of AND, OR rules, and "Negation" rule, e.g., NOT conditions, facilitates elimination of false positives through multiple iterations of refinements.

At block 314, model interpretability techniques are applied to generate additional rules. The model interpretability techniques is the degree to which a model may be understood in human terms. The model interpretability techniques may be from a model interpretability module, which is included in the block 116 in FIG. 1*a*.

In one embodiment, as discussed above, the framework of the system in the present disclosure may provide the flexibility to configure various parameters. The parameters may include the number of N-grams required to represent the class and a threshold of the entropy value to determine whether a rule should be generated.

In one embodiment, combining the rule learning results with machine learning techniques helps an overall prediction process. In essence, a machine learning model can be supplemented with the generated rules in order to enhance the predictive ability of the model and reduce classification false positives. The methodology to combine both approaches depends on the nature of data sets, and the methodology may be configured according to one or more use-cases. Once the rules are ready, sematic patterns and equivalent forms of rules may be generated to enhance the vocabulary in the rules. The methodology may enhance patterns learnt for each class with semantically similar patterns, which helps in broader coverage of rules and resulting in improving recall without compromising a high precision.

In one embodiment, a cosine similarity may be used for applying the rules on the new data instead of direct N-gram matching. The cosine similarity may measure the text-similarity between two documents irrespective of their size. A word may be represented into a vector form. The text documents may be represented in n-dimensional vector space.

Referring to FIG. 4, a table 400 between rules, reviews, and labels is shown, according to various embodiments of the present disclosure.

In FIG. 4, in a first example, a rule including "Glitch||error||crash ||bug||spin freeze" is created for a label "Application Issues." Therefore, for a review of a sentence "A lot of glitches in the app," glitch is identified in the sentence, so the sentence is labeled with "Application Issues".

In a second example, a rule including "app & help||helpful" is created for a label "Helpful." Therefore, for a review of a sentence "the app is very helpful," "app" and "helpful" are identified to satisfy the rule, then the sentence is labeled with "Helpful."

Referring to FIG. 5, a flow diagram 500 of finding labels by using mutually exclusive rules is shown, according to various embodiments of the present disclosure.

At block 502, one or more rules may be created based in the block 310 discussed above in FIG. 3. At block 504, the data is provided from data stores. At block 506, one or more labels may be matched for the data based on the one or more rules. In this example, label 1 is Make_Restaurant_Reservation and label 2 is Restaurant_General. At block 508, mutually exclusive rules are applied to the label 1 and label 2. In an example, a rule may match label 1 and label 2, but only label 1 may be used by the mutually exclusive rules since label 1 is a specific label for the rule. At block 510, a label is chosen. In this case, "Make_Restaurant_Reservation" in label 1 is chosen for the rule.

Referring to FIG. 6, a table 600 of rules with an entropy value being zero is shown, according to various embodiments of the present disclosure.

In table 600, these are examples of rules with "OR" condition. The rules in table 600 are triggered if any one of the N-gram is present in an input sentence or text from the data resources. Therefore, the entropy value is zero for these rules.

For example, if an input sentence "this is a useful app" is provided into the rule learning model, then a label "Helpful" may be assigned to the input sentence. In another example, if an input sentence "I need to change password" is provided into the rule learning model, then a label "Login Issues" may be assigned to the input sentence.

Referring to FIG. 7, a table 700 of rules with an entropy value being less than a threshold value is shown, according to various embodiments of the present disclosure.

In one embodiment, the threshold value is discussed above. The rules may not be created if the entropy value is larger than a threshold value. In this example, the example rules in the table 700 are triggered if all the N-gram in the rules are present in the input sentence.

For example, if an input sentence "We ordered breakfast using a mobile phone" is provided into the rule learning model, then a label "food delivery" may be assigned to the input sentence since "breakfast," "order," and "mobile" are present in the input sentence.

Referring to FIG. 8, a table 800 of other rules with an entropy value being less than a threshold value is shown, according to various embodiments of the present disclosure.

In this example, the example rules in the table 800 are triggered if combination of "OR" condition and "Negation" condition are satisfied and present in the input sentence.

For example, if an input sentence "the card is being updated" is provided into the rule learning model, then the label "Application Updates" may not be assigned to the input sentence since "card" is present in the input sentence and then Negation condition excludes the use of "card" in the input sentence to be labeled with "Application Updates". However, if the input sentence "a computer is being updated" is provided, then this input sentence is assigned the label "Application Updates" since this input sentence satisfies both the "OR" condition and "Negation" condition in the rules.

Figure 9:
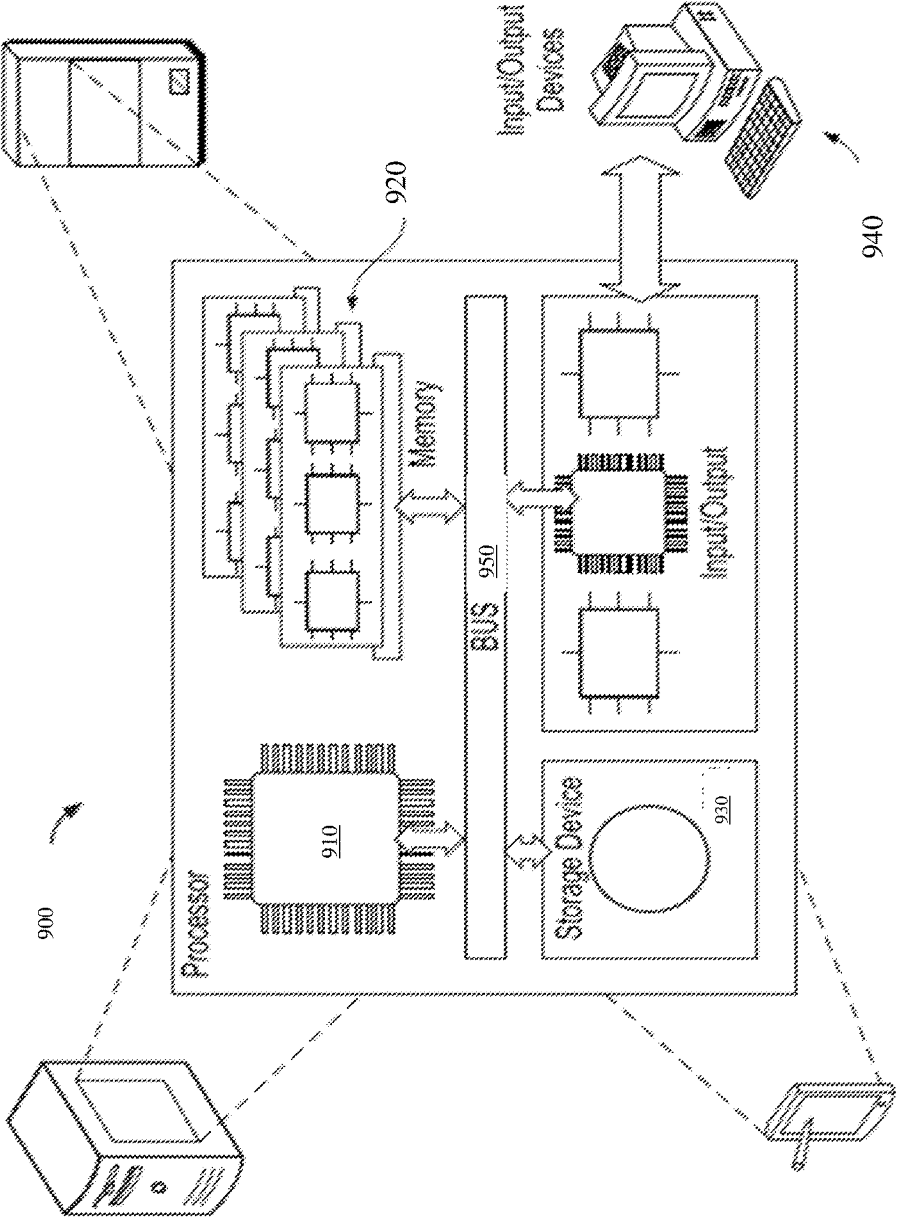
FIG. 9 illustrates a schematic diagram of a generic computer system, according to various embodiments of the present disclosure.

An example of a type of user's computer is shown in FIG. 9, which shows a schematic diagram of a generic computer system 900. The user interface described above may be implemented as a software application and the software application may be used in the user's computer. The user's computer may be a desktop computer or a laptop.

The system 900 may be used for the operations described in association with any of the method, according to one implementation. The functions and the algorithms described above may be performed in the software application in the user's computer. For example, a user of the UI may use the system 900 to access the user interface. The system 900 includes a processor 910, a memory 920, a storage device 930, and an input/output device 940. Each of the components 910, 920, 930, and 940 is interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information, e.g., the user interface on the input/output device 940.

As discussed earlier, the processor 910 may be used to calculate the entropy value for each of the one or more N-grams. The processor 910 may be used to create one or more rules, as discussed earlier. The processor 910 may execute the processes and machine learning algorithm in the present disclosure.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various implementations, the storage device 930 may be a floppy disk device, a hard disk device, an optical disk device, or a tape device. The storage device 930 may store data such as input data or training data, as discussed earlier.

The input/output device 940 provides input/output operations for the system 900. In one implementation, the input/output device 940 includes a keyboard and/or pointing device. In another implementation, the input/output device 940 includes a display unit for displaying graphical user interfaces.

While this specification contains many specific implementation details, these should not be construed as limitations on the scope of what may be claimed, but rather as descriptions of features that may be specific to particular embodiments.

It is to be understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventor did not consider such subject matter to be part of the disclosed inventive subject matter.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

Obviously, numerous modifications and variations are possible in light of the above teachings. It is therefore to be understood that within the scope of the appended claims, embodiments of the present disclosure may be practiced otherwise than as specifically described herein.

What is claimed is:

1. A computer-implemented method for improving a machine learning model, the method comprising:

receiving labelled data from one or more data sources;

clustering the labelled data when an amount of the labelled data is above a threshold value;

generating a plurality of segments from the labelled data, wherein the plurality of segments is associated with a plurality of classes, and wherein the plurality of segments comprises unique segments;

calculating an entropy value for each of the unique segments;

for each class in the plurality of classes, performing rule learning to generate one or more rules based on each of the plurality of segments associated with the class and the entropy value calculated for each unique segment associated with the class, wherein generating the one or more rules comprises determining one or more logical operators for each rule based on how far each corresponding entropy value deviates from a predefined value; and combining the generated one or more rules with the machine learning model trained by the labelled data to reduce false positives and improve recall of the machine learning model.

2. The method of claim 1, wherein clustering the labelled data comprises performing clustering of centroid samples on the labelled data if the labelled data is above the threshold value.

3. The method of claim 2, wherein the clustering of centroid samples includes clustering a defined number of nearest centroids samples.

4. The method of claim 2, wherein the threshold value depends on configurations of a user and one or more hardware limitations of a system for improving a prediction process.

5. The method of claim 1, further comprising performing one or more pre-processing steps on the labelled data.

6. The method of claim 1, wherein each of the unique segments has one label.

7. The method of claim 1, wherein the labelled data is input data for a classifier model to form one or more predictions.

8. The method of claim 7, wherein one or more false positives are extracted from the one or more predictions.

9. The method of claim 8, wherein one or more model explainability techniques and the extracted one or more false positives are used to create additional rules.

10. The method of claim 1, wherein the plurality of segments is generated using one or more tokenizers, and one or more model explainability techniques are used to determine which token used by the one or more tokenizers results in misclassification of the labelled data.

11. The method of claim 1, wherein the one or more rules are created by a semantic rule builder.

12. A computer system for improving a machine learning model, the system comprising:

a memory; and one or more processors coupled with the memory, wherein the one or more processors, when executed, perform operations comprising:

receiving labelled data from one or more data sources;

clustering the labelled data when an amount of the labelled data is above a threshold value;

generating a plurality of segments from the labelled data, wherein the plurality of segments is associated with a plurality of classes, and wherein the plurality of segments comprises unique segments;

calculating an entropy value for each of the unique segments;

for each class in the plurality of classes, performing rule learning to generate one or more rules based on each of the plurality of segments associated with the class and the entropy value calculated for each unique segment associated with the class, wherein generating the one or more rules comprises determining one or more logical operators for each rule based on how far each corresponding entropy value deviates from a predefined value; and combining the generated one or more rules with the machine learning model trained by the labelled data to reduce false positives and improve recall of the machine learning model.

13. The system of claim 12, wherein clustering the labelled data comprises performing clustering of centroid samples on the labelled data if the labelled data is above the threshold value.

14. The system of claim 13, wherein the clustering of centroid samples includes clustering a defined number of nearest centroids samples.

15. The system of claim 13, wherein the threshold value depends on configurations of a user and one or more hardware limitations for improving a prediction process.

16. The system of claim 12, further comprising performing one or more pre-processing steps on the labelled data.

17. The system of claim 12, wherein each of the unique segments has one label.

18. The system of claim 12, wherein the labelled data is input data for a classifier model to form one or more predictions.

19. The system of claim 18, wherein one or more false positives are extracted from the one or more predictions.

20. A non-transitory computer readable medium containing computer-readable instructions stored therein for causing a computer processor to perform operations comprising:

receiving labelled data from one or more data sources;

clustering the labelled data when an amount of the labelled data is above a threshold value;

generating a plurality of segments from the labelled data, wherein the plurality of segments is associated with a plurality of classes, and wherein the plurality of segments comprises unique segments;

calculating an entropy value for each of the unique segments;

for each class in the plurality of classes, performing rule learning to generate one or more rules based on each of the plurality of segments associated with the class and the entropy value calculated for each unique segment associated with the class, wherein generating the one or more rules comprises determining one or more logical operators for each rule based on how far each corresponding entropy value deviates from a predefined value; and combining the generated one or more rules with a machine learning model trained by the labelled data to reduce false positives and improve recall of the machine learning model.

* * * * *